US008954637B1

(12) United States Patent
Chew (10) Patent No.: US 8,954,637 B1
(45) Date of Patent: Feb. 10, 2015

(54) COMMUNICATIONS CABLE FOR A STORAGE DEVICE

(71) Applicant: Western Digital Technologies, Inc., Irvine, CA (US)

(72) Inventor: David W. Chew, San Juan Capistrano, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/918,895

(22) Filed: Jun. 14, 2013

Related U.S. Application Data

(60) Provisional application No. 61/811,303, filed on Apr. 12, 2013.

(51) Int. Cl.
*G06F 13/38* (2006.01)
*G06F 3/06* (2006.01)

(52) U.S. Cl.
CPC .................................. *G06F 13/385* (2013.01)
USPC ............. 710/63; 710/2; 710/5; 710/8; 710/11

(58) Field of Classification Search
None
See application file for complete search history.

(56) References Cited

U.S. PATENT DOCUMENTS

2013/0077229 A1* 3/2013 Tsai et al. ................ 361/679.31

OTHER PUBLICATIONS

Jiang Li, "Share Patriot Wireless Storage Expansion Adapter Digitizing Measurement" http://mst.zol.com.cn/378/3781128.html, Jun. 7, 2013,(Downloaded on Sep. 30, 2013) 22 pages.
http://www.acerdirect.co.uk/Acer_JZ.JBF00.001_IEEE_802.11n_Wi-Fi_Adapter_JZ.JBF00.001/version.asp, (Downloaded on Sep. 30, 2013) 2 pages.
Netgear Installation Guide, "A6200 WiFi USB Adapter", Sep. 19, 2012 (Downloaded on Sep. 19, 2012) 2 pages.

* cited by examiner

*Primary Examiner* — Scott Sun (57) ABSTRACT

A communications cable including a first communications interface configured to be connected to a storage device, a second communications interface configured to receive data and power, a wireless access module configured to be powered by the power received by the second communications interface and to enable wireless access of the storage device, and a cable unit including one or more cables and configured to connect the wireless access module to the first communications interface and the second communications interface, and the first communications interface to the second communications interface.

25 Claims, 5 Drawing Sheets

COMMUNICATIONS CABLE FOR A STORAGE DEVICE

CROSS-REFERENCE TO RELATED APPLICATIONS

This application claims the benefit of U.S. Provisional Application No. 61/811,303, filed on Apr. 12, 2013, entitled "COMMUNICATIONS CABLE FOR A STORAGE DEVICE," which is hereby incorporated by reference in its entirety.

BACKGROUND

In a conventional storage device, the user may plug the conventional storage device to a computer. In such a case, the user may utilize the conventional storage device as a back-up drive to back up files or folders. In addition, the user may utilize the conventional storage device as an extra storage location to store files and folders which the user may not want to have located on the computer due to limited space or security reasons.

However, with the conventional storage device, the user generally connects the conventional storage device directly to the computer using, for example, a universal serial bus (USB) cable. Thus, when the user wants the computer to access the conventional external storage device, the user plugs in the USB cable to both the computer and the conventional external storage device. When the user unplugs the USB cable, the computer will not be able to access the conventional external storage device. The user can then plug the USB cable onto another computer in order for the other computer to access the conventional external storage device.

However, the plugging and unplugging of the USB cable may be inconvenient, especially in areas where there is limited space available or the computer which needs to access the conventional external storage device is a mobile device and needs to access the conventional external storage device wirelessly. In addition, the plugging and unplugging of the USB cable may be inconvenient when multiple computers or devices wish to access the conventional external storage device in a relatively short period of time or simultaneously.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
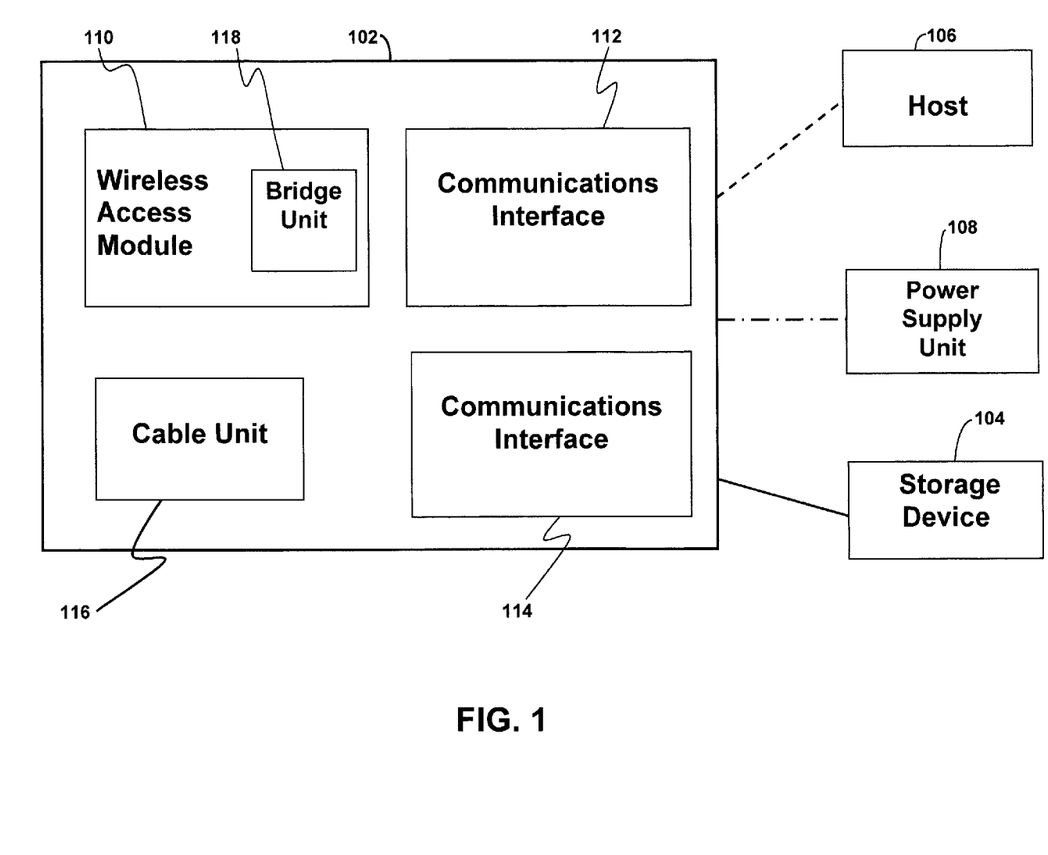
FIG. 1 is a block diagram of a communications cable, a host, a power supply unit, and a storage device according to an embodiment.

In an embodiment shown in FIG. 1, a communications cable 102 is configured to be connected to a storage device 104, a host 106, and a power supply unit 108. In an embodiment, the storage device 104 comprises at least one of a magnetic recording disk or a solid state memory. The storage device 104 can be configured to store data in the magnetic recording disk and/or the solid state memory. In an embodiment, the storage device 104 comprises a cable box, a backup disk drive, a media storage unit, a streaming media device, a digital camera, or any other electronic device which may store data that may need to be accessed directly or wirelessly. For example, the storage device 104 could comprise data which a mobile device may need to access wirelessly.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

The host 106 can be, for example, an electronic device which is configured to access data stored in the storage device 104 using the communications cable 102. In an embodiment, the host 106 comprises a personal computer, a laptop, a tablet, a mobile phone, or any other device which may wish to access the data stored in the storage device 104.

In an embodiment, the power supply unit 108 comprises car cigarette lighter adapters, car stereos, phone/pad adapters and chargers, airline seats, or other types of power supplies. In an embodiment, the power supply unit 108 comprises a DC/DC converter or an AC/DC converter. In an embodiment, the power supply unit 108 is configured to supply power to the communications cable 102, which will be described in more detail later.

In an embodiment, a storage system comprises the communications cable 102 and the storage device 104. In an embodiment, the communications cable 102 is configured to be connected to the storage device 104 and one of the host 106 or the power supply unit 108. That is, the communications cable 102 is configured to be connected to the storage device 104 and the host 106 at the same time or the storage device 104 and the power supply unit 108 at the same time, which will be described in more detail below.

In an embodiment, the communications cable 102 comprises a wireless access module 110, a communications interface 112, a communications interface 114, and a cable unit 116. The communications cable 102 can be seen, for example, in an embodiment shown in FIG. 2.

Figure 2:
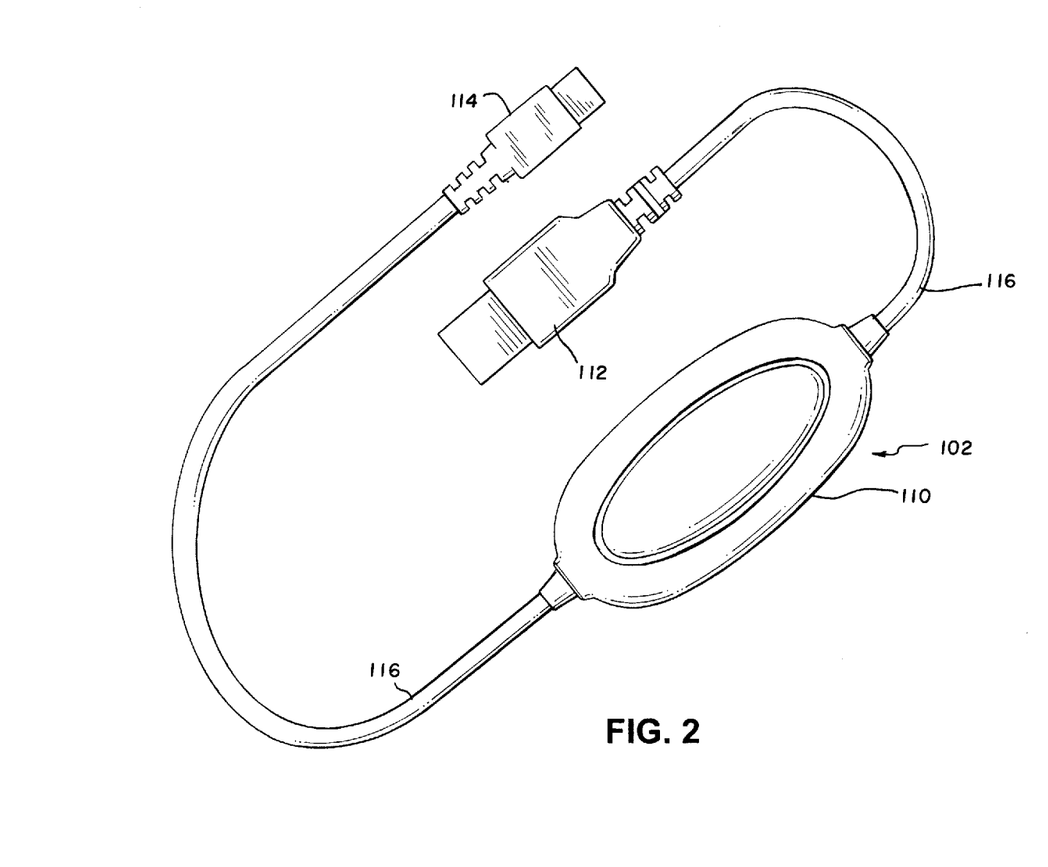
FIG. 2 depicts a communications cable according to an embodiment.

In an embodiment, the cable unit 116 comprises one or more cables. Furthermore, the cable unit 116 is configured, for example, to connect the wireless access module 110 to the communications interface 112 and the communications interface 114, and to connect the communications interface 112 to the communications interface 114.

The communications interfaces 112 and 114 can comprise, for example, serial bus interfaces such as universal serial bus ("USB") interfaces. In the embodiment shown in FIG. 2, the communications interface 112 comprises a USB standard-A plug while the communications interface 114 comprises a USB micro-B plug. However, the communications interface 112 could comprise a USB micro-B plug and the communications interface 114 could comprise a USB standard-A plug. In an embodiment, the communications interface 112 and the communications interface 114 can comprise other types of USB plugs. For example, the communications interface 112 and the communications interface 114 can comprise a USB standard-B plug, a USB mini-A plug, a USB mini-B plug, a USB mini-AB plug, a USB micro-A plug, or a USB micro-AB plug. In addition, the communications interface 112 and the communications interface 114 need not comprise the same type of USB plugs. In an embodiment, the communications interface 112 and the communications interface 114 can utilize a communications protocol or interfaces aside from USB such as other serial bus protocols or interfaces. In some embodiments, the communications interface 112 or the communications interface 114 utilizes a Thunderbolt interface or other type of connection interface.

In an embodiment, the communications interface 112 is configured to be connected to the host 106 or the power supply unit 108 while the communications interface 114 is configured to be connected to the storage device 104. In an embodiment, the communications interface 112 is configured to receive data from a serial bus. For example, when the communications interface 112 is connected to the host 106, the communications interface 112 may receive data from a serial bus. In an embodiment, the communications interface 112 is configured to receive power from a power bus line. For example, when the communications interface 112 is connected to the host 106, the communications interface 112 may receive power from a power bus line.

In an embodiment, when the communications interface 112 is connected to the host 106, and the communications interface 114 is connected to the storage device 104, the communications interface 112 may enable direct access to the storage device 104. Thus, the host 106 may directly access the storage device 104. In an embodiment, the communications interface 112 may provide data transfer speeds of approximately 3.2 Gbits/s. In an embodiment the communications interface 112 may provide data transfer speeds of approximately 10 Gbits/s. In an embodiment, the communications interface 112 may provide data transfer speeds according to a USB 2.0 protocol. In an embodiment, the communications interface 112 may provide data transfer speeds according to a USB 3.0 protocol. In an embodiment, the communications interface 112 may provide data transfer speeds according to a Thunderbolt protocol. In an embodiment, although data transfer speeds are disclosed above, additional data transfer speeds may be possible.

Figure 3:
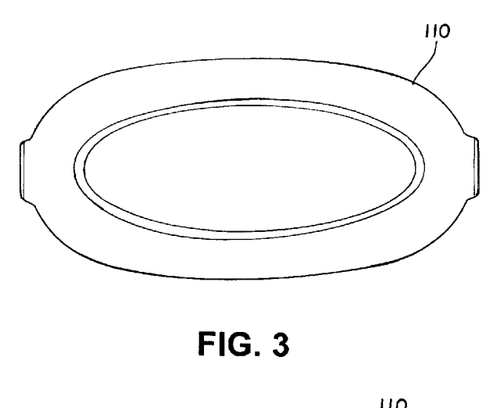
FIG. 3 depicts a top view of a wireless access module of a communications cable according to an embodiment.
Figure 4:
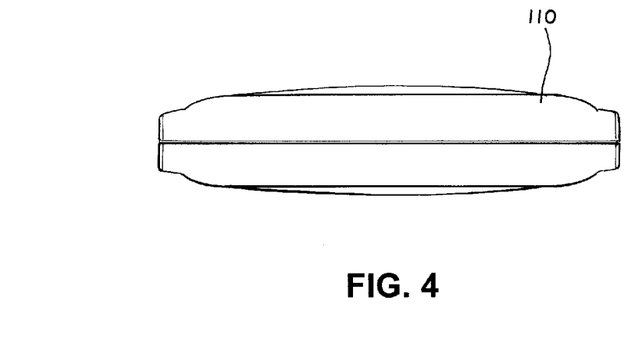
FIG. 4 depicts a side view of a wireless access module of a communications cable according to an embodiment.
Figure 5:
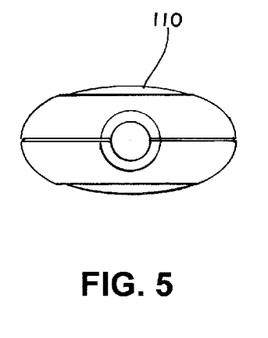
FIG. 5 depicts a side view of a wireless access module of a communications cable according to an embodiment.

In an embodiment, the wireless access module 110 is configured to enable wireless access of the storage device 104. In addition to the embodiment shown in FIG. 2, the wireless access module 110 can also be seen in the embodiments shown in FIGS. 3-5. In the embodiment shown in FIG. 3, a top view of the wireless access module is depicted. In the embodiment shown in FIGS. 4 and 5, different side views of the wireless access module 110 are shown. In the embodiments shown in FIGS. 3-5, the wireless access module 110 comprises an approximately oval shape which is elongated in a direction where the cables of the cable unit 116 may be attached to the wireless access module 110. However, it is understood that the wireless access module 110 may comprise additional shapes and sizes.

In an embodiment, the wireless access module 110 is configured to be powered by the power received by the communications interface 112. For example, the communications interface 112 can receive power from the power supply unit 108 when the communications interface 112 is connected to the power supply unit 108. The power received at the communications interface 112 from the power supply unit 108 may be used to power the wireless access module 110. In an embodiment, the wireless access module 110 need not be powered by a separate AC adapter aside from the power supply unit 108. In an embodiment, the wireless access module 110 is configured to be powered only by the power received by the communications interface 112.

However, in an embodiment, the wireless access module 110 may also be configured to be powered by the power received by the communications interface 114. For example, the power received at the communications interface 114 from the storage device 104 may be used to power the wireless access module 110. The storage device 104 may, for example, comprise an external power source such as an AC adapter. In an embodiment, the wireless access module 110 may be powered only by the power received by the communications interface 114, or a combination of the power received by the communications interface 112 and the power received by the communications interface 114.

In an embodiment, the wireless access module 110 enables wireless access of the storage device 104 when the communications interface 112 is connected to the power supply unit 108 and the communications interface 114 is connected to the storage device 104. Thus, an electronic device may wirelessly access the storage device 104. For example, when the wireless access module 110 is powered by the communications interface 112, the wireless access module 110 can be configured to connect to a network. In an embodiment, if the electronic device is on the same network, then the electronic device may be permitted to access the storage device 104. In an embodiment, the electronic device may be required to be authenticated before access to the storage device 104 is granted by the wireless access module 110. In such a case, the wireless access module 110 may be configured to authenticate the electronic device before granting wireless access to the storage device 104.

In an embodiment, more than one electronic device may be able to access the storage device 104 simultaneously. In an embodiment, the wireless access module 110 may allow the wireless access module 110 and/or the storage device 104 to be discoverable on the network. In an embodiment, the wireless access module 110 may obtain a network address, such as an IP address, from a router in the network. In an embodiment, the wireless access module 110 may utilize TCP/IP. In an embodiment, the wireless access module 110 may utilize IEEE 802.11 standards and various versions thereof including but not limited to 802.11a/b/g/n/ac/ad or any combination thereof.

In an embodiment, the wireless access module 110 may comprise a button or switch which may be utilized to activate the wireless access module 110 before the wireless access module 110 will connect to the network. In an embodiment, the wireless access module 110 may comprise one or more indicators (not shown) which may be utilized to indicate when the wireless access module 110 is powered, trying to connect to the network, disconnected from the network, and/or connected to the network.

In an embodiment, the wireless access module 110 comprises a bridge unit 118 which aids in providing wireless access to the storage device 104. In an embodiment, the bridge unit 118 comprises a USB bridge. In an embodiment, the bridge unit 118 comprises a Thunderbolt bridge. In an embodiment, the bridge unit can translate between two different protocols. For example, if the storage device 104 communicates in a first protocol, but not a second protocol, the bridge unit 118 can translate the second protocol to the first protocol. Thus, the storage device 104 can communicate in the second protocol using the bridge unit 118, even if it is not able to do so natively.

In an embodiment, the communications cable 102 through the wireless access module 110 and the bridge unit 118 provides wireless access of the storage device 104 which may not be configured for wireless access. That is, the storage device 104 may not understand data transmitted through a Wi-Fi protocol. In an embodiment, the communications cable 102 can allow the storage device 104 to be wirelessly accessible by translating data transmitted through the Wi-Fi protocol into a protocol that the storage device understands (e.g., USB, Thunderbolt, Serial ATA or the like).

In an embodiment, the wireless access module 110 enables wireless access to the storage device 104 even when the communications interface 112 is connected to the host 106 instead of the power supply unit 108. In such a case, the wireless access module 110 is powered by the host 106. In an embodiment, the communications interface 112 may also enable direct access to the storage device 104. Therefore, the storage device 104 may have both direct access and wireless access enabled.

However, in an embodiment, the wireless access module 110 disables wireless access of the storage device 104 when the communications interface 112 is connected to the host 106. Thus, while direct access to the storage device 104 may be enabled by the communications interface 112, the wireless access module 110 can disable wireless access to the storage device 104.

In an embodiment, the wireless access provided by the wireless access module 110 is a Wi-Fi access that may support one or more variations of 802.11. However, the wireless access provided by the wireless access module 110 need not be limited to just Wi-Fi access, but can also be other types of wireless access instead of or in addition to Wi-Fi access. In an embodiment, one or more components of the wireless access module 110 may be integrated into the storage device 104.

In an embodiment, the communications cable 102 is configured to work with only authorized storage devices 104. That is, the communications cable 102 may authenticate the storage device 104 before providing direct, wireless, or both types of access to the storage device 104. In an embodiment, the authentication may ensure that only a storage device allowed to have direct or wireless access is connected to the communications cable 102. In an embodiment, the authentication may ensure that only compatible storage devices are connected to the communications cable 102. In an embodiment, the wireless access module 110 may provide such authentication of the storage device 104.

Figure 6:
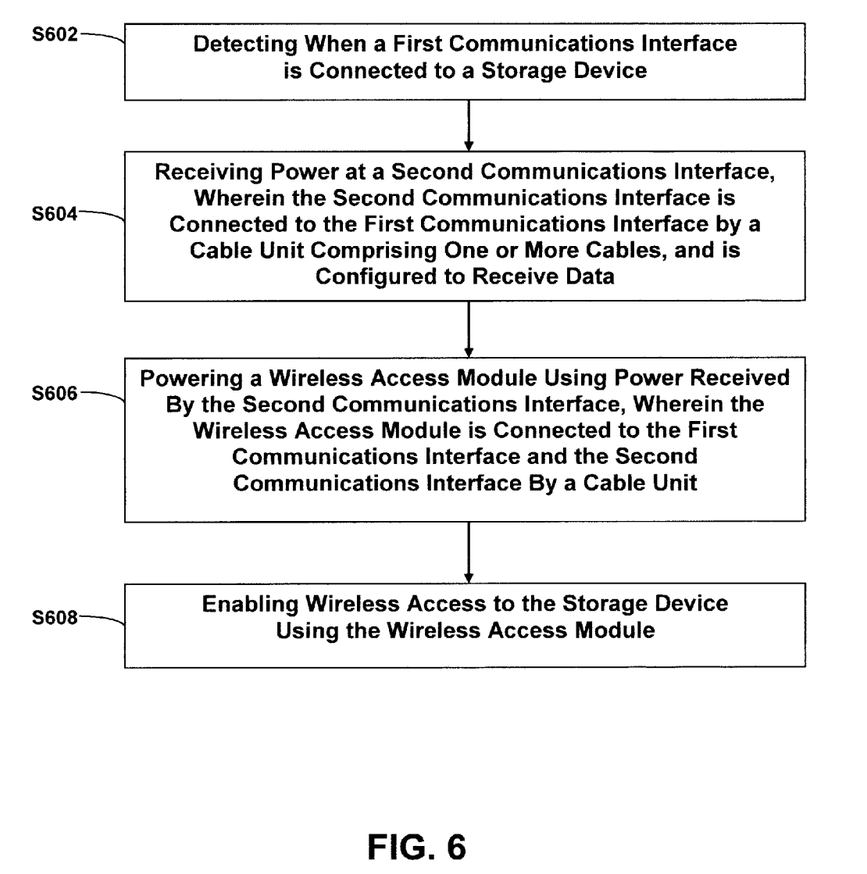
FIG. 6 depicts a process for accessing a storage device according to an embodiment.

In an embodiment, a process for accessing a storage device is shown in FIG. 6. In block S602, the communications cable detects when the communications interface 114 is connected to the storage device 104. For example, the wireless access module 110 can detect when the communications interface 114 is connected to the storage device 104. In block S604, power is received at the communications interface 112 wherein the communications interface 112 is connected to the communications interface 114 by the cable unit 116 comprising one or more cables, and is configured to receive data. In block S606, the wireless access module 110 is powered using power received by the communications interface 112, wherein the wireless access module 110 is connected to the communications interface 112 and the communications interface 114 by the cable unit. In block S608, wireless access to the storage device 104 is enabled using the wireless access module 110.

Figure 7:
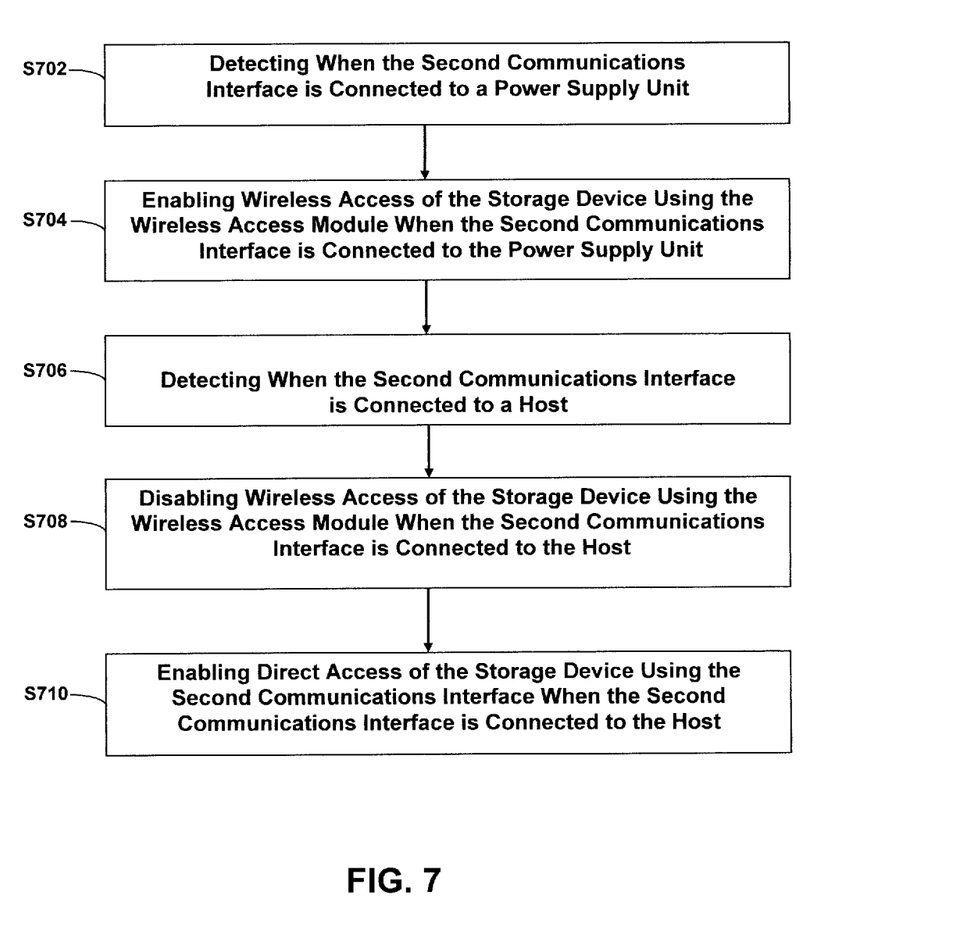
FIG. 7 depicts a process for accessing a storage device according to an embodiment.

In an embodiment, one or more additional optional blocks of the process for accessing a storage device are shown in FIG. 7. In block S702, the communications cable 102 detects when the communications interface 112 is connected to the power supply unit 108. For example, the wireless access module 110 can detect when the communications interface 112 is connected to the power supply unit 108. In block S704, wireless access of the storage device 104 is enabled using the wireless access module 110 when the communications interface 112 is connected to the power supply unit 108. In block S706, the communications cable 102 detects when the communications interface 112 is connected to the host 106. For example, the wireless access module 110 can detect when the communications interface 112 is connected to the power supply unit 108. In block S708, wireless access of the storage device 104 is disabled using the wireless access module 110 when the communications interface 112 is connected to the host 106. In block S710, direct access of the storage device 104 is enabled using the communications interface 112 when the communications interface 112 is connected to the host 106.

In an embodiment, the wireless access module 110 comprises one or more controllers to perform various operations disclosed above. Furthermore, in an embodiment, the wireless access module 110 comprises a non-transitory machine readable medium configured to store software which when executed by one or more controllers of the wireless access module 110, may cause the one or more controllers to perform one or more operations disclosed above.

In an embodiment, the communications cable 102 comprises a single integrated cable. For example, the wireless access module 110, the communications interfaces 112 and 114, and the cable unit 116 can comprise a single integrated cable.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A communications device comprising:
a first cable connected to a first communications interface connector at a first end, the first communications interface connector being configured to be connected to a data storage device;
a second cable connected to a second communications interface connector at a first end, the second communications interface connector configured to be connected to a host device and receive data and power therefrom; and
a housing fixed to a second end of the first cable and a second end of the second cable, the housing having disposed therein a wireless access device configured to be powered by the power received by the second communications interface connector and to enable wireless access of the data storage device.

2. The communications device of claim 1 wherein the second communications interface connector is configured to be connected to a host or a power supply unit.

3. The communications cable of claim 2 wherein the wireless access device is configured to enable wireless access of the data storage device when the second communications interface connector is connected to the power supply unit.

4. The communications device of claim 2 wherein the wireless access device is configured to disable wireless access of the data storage device when the second communications interface connector is connected to the host.

5. The communications device of claim 2 wherein the second communications interface connector is configured to enable direct access of the data storage device when the second communications interface connector is connected to the host.

6. The communications device of claim 1 wherein the wireless access device comprises a bridge unit, and the wireless access device is configured to enable wireless access to the data storage device using the bridge unit.

7. The communications device of claim 1 wherein the second communications interface connector is configured to receive data from a serial bus.

8. The communications device of claim 1 wherein the second communications interface connector is configured to receive power from a power bus line.

9. The communications device of claim 1 wherein the first communications interface connector is configured to receive power from the data storage device over the first communications interface connector, and the wireless access device is configured to be powered by the power received by the first communications interface connector.

10. The communications device of claim 1 wherein the first communications interface connector, the second communications interface connector, the wireless access device, the first cable and the second cable form a single integrated cable structure.

11. A method for accessing a storage device comprising:
detecting when a first communications interface connector is connected to a storage device, the first communications interface connector being connected to a first cable at a first end of the first cable;
receiving power at a second communications interface connector, wherein the second communications interface connector is configured to receive data, and wherein the second communications interface connector is connected to a second cable at a first end of the second cable;
powering a wireless access device using power received by the second communications interface connector, wherein the wireless access device is disposed within a housing that is fixed to a second end of the first cable and a second end of the second cable; and
enabling wireless access to the storage device using the wireless access device.

12. The method of claim 11 further comprising:
detecting when the second communications interface connector is connected to a power supply unit; and
enabling wireless access of the storage device using the wireless access device when the second communications interface connector is connected to the power supply unit.

13. The method of claim 11 further comprising:
detecting when the second communications interface connector is connected to a host; and
disabling wireless access of the storage device using the wireless access device when the second communications interface connector is connected to the host.

14. The method of claim 11 further comprising:
detecting when the second communications interface connector is connected to a host; and
enabling direct access of the storage device using the second communications interface connector when the second communications interface is connected to the host.

15. The method of claim 11 wherein the wireless access device comprises a bridge unit, and the wireless access device is configured to enable wireless access to the storage device using the bridge unit.

16. The method of claim 11 further comprising receiving data at the second communications interface connector from a serial bus.

17. The method of claim 11 further comprising receiving power at the second communications interface connector from a power bus line.

18. A storage system comprising:
a data storage device comprising at least one of a magnetic recording disk or a solid state memory; and
a communications device configured to connect to the data storage device, the communications device comprising:
a first cable connected to a first communications interface connector at a first end, the first communications interface connector being configured to be connected to the data storage device;
a second cable connected to a second communications interface connector at a first end, the second communications interface connector configured to be connected to a host device and receive data and power therefrom; and
a housing fixed to a second end of the first cable and a second end of the second cable, the housing having disposed therein a wireless access device configured to be powered by the power received by the second communications interface connector and to enable wireless access of the data storage device.

19. The storage system of claim 18 wherein the second communications interface connector is configured to be connected to a host or a power supply unit.

20. The storage system of claim 19 wherein the wireless access device is configured to enable wireless access of the storage device when the second communications interface connector is connected to the power supply unit.

21. The storage system of claim 19 wherein the wireless access device is configured to disable wireless access of the storage device when the second communications interface connector is connected to the host.

22. The storage system of claim 19 wherein the second communications interface connector is configured to enable direct access of the storage device when the second communications interface connector is connected to the host.

23. The storage system claim 18 wherein the wireless access device comprises a bridge unit, and the wireless access device is configured to enable wireless access to the storage device using the bridge unit.

24. The storage system of claim 18 wherein the second communications interface connector is configured to receive data from a serial bus.

25. The storage system of claim 18 wherein the second communications interface connector is configured to receive power from a power bus line.

* * * * *